United States Patent
Nagatani

(10) Patent No.: US 9,733,554 B2
(45) Date of Patent: Aug. 15, 2017

(54) PROJECTOR HAVING ILLUMINATION UNIT AND PROJECTION UNIT DISPOSED ON BASE FRAME

(71) Applicant: Seiko Epson Corporation, Tokyo (JP)

(72) Inventor: Kaname Nagatani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 42 days.

(21) Appl. No.: 14/638,772

(22) Filed: Mar. 4, 2015

(65) Prior Publication Data

US 2015/0268540 A1 Sep. 24, 2015

(30) Foreign Application Priority Data

Mar. 18, 2014 (JP) ................................ 2014-054508

(51) Int. Cl.
G03B 21/16 (2006.01)
G03B 21/14 (2006.01)
G03B 21/00 (2006.01)

(52) U.S. Cl.
CPC ......... G03B 21/145 (2013.01); G03B 21/005 (2013.01); G03B 21/16 (2013.01)

(58) Field of Classification Search
CPC ..... G03B 21/145; G03B 21/005; G03B 21/16
See application file for complete search history.

(56) References Cited

U.S. PATENT DOCUMENTS

| 5,800,032 A * | 9/1998 | Uchiyama | G03B 21/145 348/E5.141 |
| 5,993,008 A * | 11/1999 | Hashimukai | G03B 21/16 348/E5.143 |
| 2005/0012910 A1* | 1/2005 | Fujimori | H04N 9/3105 353/119 |
| 2008/0266527 A1* | 10/2008 | Fuse | G03B 5/04 353/38 |

FOREIGN PATENT DOCUMENTS

| CN | 1573516 A | 2/2005 | |
| JP | 2013-88743 A | 5/2013 | |
| JP | 2013088743 A * | 5/2013 | ............. G03B 21/14 |

OTHER PUBLICATIONS

Machine translation of JP 2013-088743 A, Matsumiya et al., May 13, 2013.*

* cited by examiner

Primary Examiner — Sultan Chowdhury
Assistant Examiner — Magda Cruz
(74) Attorney, Agent, or Firm — ALG Intellectual Property, LLC

(57) ABSTRACT

A projector includes an illumination unit having an optical system including a light source apparatus, an image formation unit having an optical system including liquid crystal panels, a projection unit having an optical system including a projection lens, and a base frame on which the illumination unit and the projection unit to which the image formation unit is coupled are disposed, and a gap is provided between the illumination unit and the projection unit.

5 Claims, 7 Drawing Sheets

PROJECTOR HAVING ILLUMINATION UNIT AND PROJECTION UNIT DISPOSED ON BASE FRAME

BACKGROUND

1. Technical Field

The present invention relates to a projector.

2. Related Art

There is a known projector of related art in which light outputted from a light source apparatus is modulated by a light modulator in accordance with image information and the modulated light is projected through a projection lens onto a projection surface.

JP-A-2013-88743 discloses a projector including a controller having a normal mode in which a light source and a light modulator are cooled by controlling the speed of rotation of a cooling fan and an auxiliary mode in which the speed of rotation of the cooling fan is controlled to differ from the speed of rotation in the normal mode based on the temperature in an exterior enclosure after the projector is activated. In a situation in which constituent members of the projector expand due to an increase in the temperature of the light source and therefore shift a projection position, the configuration described above quickly achieves a balanced state in the enclosure by using the auxiliary mode to shorten the period required to adjust the projection position.

FIGS. 7A and 7B are cross-sectional views diagrammatically showing a schematic configuration of a projector 9 of related art. FIG. 7A shows a state immediately after projection starts, and FIG. 7B shows a state during the projection.

The projector 9 of related art includes an illumination unit 90, which has an optical system including a light source apparatus 901, an image formation unit 91, which has an optical system including a light modulator 911, and a projection unit 92, which has an optical system including a projection lens 921, as shown in FIGS. 7A and 7B. The image formation unit 91 is coupled to the projection unit 92, and the projection unit 92 to which the image formation unit 91 is coupled is coupled to the illumination unit 90. A plurality of fixing portions 902, which are formed all around the exterior of the illumination unit 90, fix the illumination unit 90 to an exterior enclosure 93, which forms the exterior of the projector 9, directly or indirectly via interposed members. Further, legs 94 for placing the projector 9 on a desktop are fixed to the exterior enclosure 93. The exterior enclosure 93 is formed of a synthetic resin member.

In general, a projector has a heat generation source, such as a power supply and a light source apparatus. After the light source apparatus is turned on to start projection, the temperature of each constituent member that forms the projector gradually increases from a start temperature equal to the temperature in the environment where the projector is installed. Each constituent member that forms the projector is primarily made of a synthetic resin and therefore expands/contracts as the temperature changes, and the modulus of elasticity of the synthetic resin also changes with temperature.

In the projector 9 immediately after the projection starts, the temperature of each constituent member is equal to the temperature in the environment, and the constituent member does not deform or otherwise change and is held in an intended position thereof, as shown in FIG. 7A. In this state, an image (modulated light) is precisely projected in a projection position set on a screen (not shown).

In the configuration of related art, however, after time elapses from the start of projection, each constituent member in the projector 9 experiences an increase in temperature and expands, and the modulus of elasticity of the constituent member also changes, resulting in deformation of the constituent member, as shown in FIG. 7B. Specifically, in the projector 9, the increase in temperature causes the illumination unit 90, the image formation unit 91, and the projection unit 92 to expand and the modulus of elasticity thereof to decrease. The illumination unit 90 deforms while restricted (constrained) by the fixing portions 902, which are fixed to the exterior enclosure 93. On the other hand, the image formation unit 91 and the projection unit 92 deform while fixed to (constrained by) the deforming illumination unit 90. In this case, the image formation unit 91 and the projection unit 92 undesirably deform downward (toward desktop on which projector 9 is installed) also due, for example, to their own weights. The position of an image projected on the projection surface (projected image) therefore undesirably shifts from a predetermined position (shift in projection position).

Further, the projector 9 is installed with the legs 94 fixed to the exterior enclosure 93. Therefore, when the exterior enclosure 93 expands and the modulus of elasticity thereof decreases as the temperature increases, the exterior enclosure 93 deforms relative to the legs 94. As a result, the position of the illumination unit 90, which is fixed to (constrained by) the exterior enclosure 93 also changes, and the positions of the image formation unit 91 and the projection unit 92, which are fixed to (constrained by) the illumination unit 90, undesirably further change. The position of the projected image therefore undesirably further shifts from the predetermined position (shift in projection position).

A projector that suppresses shift in the projection position due to a change in temperature has therefore been desired.

SUMMARY

An advantage of some aspects of the invention is to solve at least a part of the problems described above, and the invention can be implemented in the form of the following aspects or application examples.

Application Example 1

This application example is directed to a projector in which light outputted from a light source apparatus is modulated by a light modulator in accordance with image information and the modulated light is projected through a projection lens onto a projection surface, the projector including an illumination unit having an optical system including the light source apparatus, an image formation unit having an optical system including the light modulator, a projection unit having an optical system including the projection lens, and a base frame on which the illumination unit and the projection unit to which the image formation unit is coupled are disposed, and a gap is provided between the illumination unit and the projection unit.

According to the projector described above, the illumination unit and the projection unit to which the image formation unit is coupled are disposed on the base frame in such a way that the illumination unit and the projection unit are structurally separate from each other, and a gap is provided between the thus disposed illumination unit and projection unit. Therefore, even when the illumination unit and the projection unit deform due to a change in temperature, the gap can accommodate the amount of deformation. In other words, providing the gap can prevent deformation that occurs in a situation in which the illumination unit and the projection unit expand, abut, and press each other. The projector achieved in this application example can suppress shift in the projection position because the projector can accommodate deformation of the illumination unit and the projection unit to which the image formation unit is coupled due to a change in temperature.

Application Example 2

In the projector according to the application example described above, it is preferable that the projector further includes legs used when the projector is placed, and the legs are disposed on the base frame directly or indirectly via interposed members each of which is a metal member.

According to the projector described above, the legs are disposed on the base frame directly or indirectly via interposed members each of which is a metal member. Therefore, for example, when the projector is placed on a desktop or any other surface, deformation of the base frame relative to the legs can be suppressed even when temperature increases. Therefore, an effect of the deformation on the illumination unit disposed on the base frame and the projection unit to which the image formation unit is coupled can be reduced, whereby the projector 1 achieved in this application example can suppress shift in the projection position.

Application Example 3

In the projector according to the application example described above, it is preferable that the projector further includes a ceiling-hung fixing unit used when the projector is hung, and the ceiling-hung fixing unit is disposed on the base frame directly or indirectly via an interposed member that is a metal member.

According to the projector described above, the ceiling-hung fixing unit is disposed on the base frame directly or indirectly via an interposed member that is a metal member. As a result, for example, when the projector is hung from a ceiling surface or any other surface, deformation of the base frame relative to the ceiling-hung fixing unit due to an increase in temperature can be suppressed. Therefore, an effect of the deformation on the illumination unit 10 disposed on the base frame 50 and the projection unit 30 to which the image formation unit 20 is coupled can be reduced, whereby the projector 1 achieved in this application example can suppress shift in the projection position.

Application Example 4

In the projector according to the application example described above, it is preferable that the base frame is formed of a metal member.

According to the projector described above, since the base frame is formed of a metal member, an increase in the modulus of elasticity of the base frame and a decrease in dependency of the modulus of elasticity on temperature can be achieved, whereby the base frame is unlikely to deform due to a change in temperature. Shift in the projection position can therefore be suppressed.

Application Example 5

In the projector according to the application example described above, it is preferable that the ceiling-hung fixing unit is formed of a metal member.

According to the projector described above, since the ceiling-hung fixing unit is formed of a metal member, an increase in the modulus of elasticity of the ceiling-hung fixing unit and a decrease in dependency of the modulus of elasticity on temperature can be achieved, whereby the ceiling-hung fixing unit is unlikely to deform due to a change in temperature. Shift in the projection position can therefore be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment will be described below with reference to the drawings.

Embodiment

Figure 1:
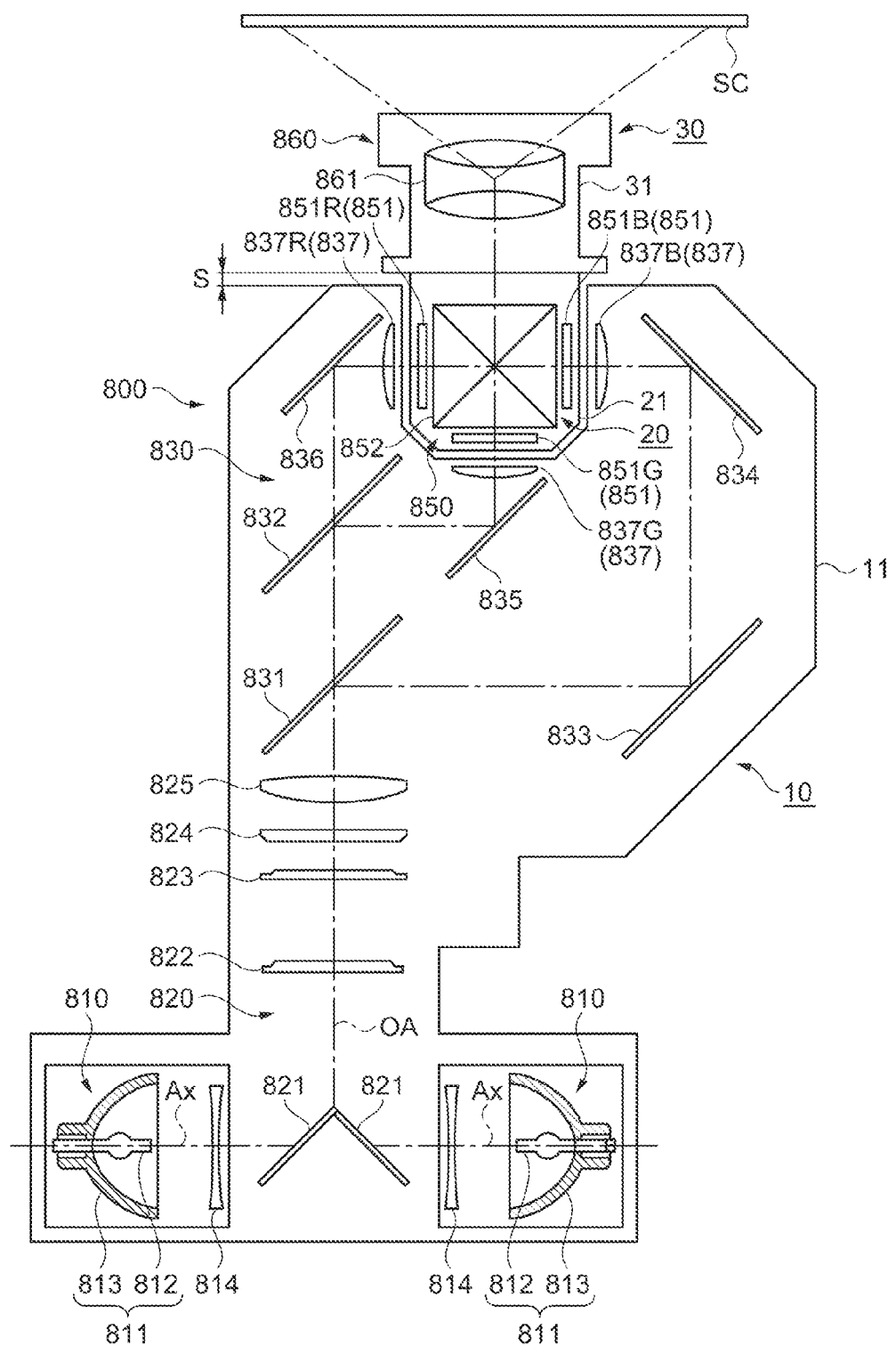
FIG. 1 diagrammatically shows the configuration of an optical system of a projector according to an embodiment.

FIG. 1 diagrammatically shows the configuration of an optical system 800 of a projector 1 according to the embodiment. The configuration and operation of the optical system 800 of the projector 1 will be described with reference to FIG. 1.

The projector 1 according to the present embodiment is an electronic apparatus in which light outputted from each light source apparatus 810 is modulated by liquid crystal panels 851 (851R, 851G, and 851B) as a light modulator in accordance with image information and the modulated light (image light) is projected through a projection lens 861 onto a projection surface (such as screen SC). The optical system 800 for performing the operation described above is provided in the projector 1.

The projector 1 further includes a controller (not shown) that oversees and controls the overall operation of the projector 1, a power supply (not shown) that supplies the controller and other components with electric power, and a cooler (not shown) that cools the interior of the projector 1, as well as the optical system 800 described above.

The optical system 800 of the projector 1 includes a light source apparatus 810, an illumination system 820, a color separation system 830, an electro-optic system 850, and a projection system 860.

The light source apparatus 810 is formed of two (a pair of) light source apparatus 810 in the present embodiment. The pair of light source apparatus 810 each include a light source apparatus body 811 and a parallelizing lens 814 and are configured in the same manner. The light source apparatus body 811 includes a discharge-type light source 812 and a reflector 813. The pair of light source apparatus 810 are so disposed that optical axes Ax of the light sources 812 substantially coincide with each other and the pair of light source apparatus 810 face each other and sandwich a pair of reflection mirrors 821. Each of the pair of light source apparatus 810 is further so configured that light fluxes emitted from the light source 812 are reflected off the reflector 813 and then so aligned with each other by the parallelizing lens 814 that the light fluxes travel in the same direction in parallel to the optical axis Ax toward the reflection mirror 821. Each of the light source apparatus 810 in the present embodiment employs an ultrahigh-pressure mercury lamp.

The illumination system 820 includes the pair of reflection mirrors 821, a first lens array 822, a second lens array 823, a polarization conversion element 824, and a superimposing lens 825. The pair of reflection mirrors 821 are disposed in correspondence with the pair of light source apparatus 810, respectively, and reflect the light outputted from the light source apparatus 810 in a direction substantially perpendicular to the optical axes Ax (direction toward first lens array 822). The first lens array 822 is formed of a plurality of lenslets arranged in a matrix. Each of the lenslets divides the light outputted from the light source apparatus 810 and reflected off the reflection mirrors 821 into sub-light fluxes and outputs the sub-light fluxes in the direction along an illumination optical axis OA. The second lens array 823 is formed of lenslets arranged in a matrix in correspondence with the sub-light fluxes having exited out of the lenslets of the first lens array 822. The second lens array 823 causes the sub-light fluxes having exited out of the first lens array 822 to exit toward the superimposing lens 825. The illumination optical axis OA is a central axis of the light outputted toward illumination receiving areas.

The polarization conversion element 824 has a function of aligning the sub-light fluxes having exited out of the second lens array 823, which are randomly polarized light fluxes, with each other into substantially one type of polarized light fluxes usable by each of the liquid crystal panels 851. The sub-light fluxes converted by the polarization conversion element 824 into substantially one type of polarized light fluxes are substantially superimposed on each other by the superimposing lens 825 on the surface of each of the liquid crystal panels 851 so that the illumination receiving area is illuminated at uniform illuminance.

The color separation system 830 includes dichroic mirrors 831 and 832, reflection mirrors 833 to 836, and collector lenses 837 (837R, 837G, and 837B). The dichroic mirror 831 transmits a red (R) light component and a green (G) light component and reflects a blue (B) light component. The dichroic mirror 832 transmits the R light component and reflects the G light component.

The reflection mirror 833 reflects the B light component reflected off the dichroic mirror 831, and the reflected B light component is further reflected off the reflection mirror 834 and incident on the collector lens 837B for B light. The B light incident on the collector lens 837B is parallelized and incident on an image formation area (illumination receiving area) of the liquid crystal panel 851B for B light. The reflection mirror 835 reflects the G light component reflected off the dichroic mirror 832, and the reflected G light component is incident on the collector lens 837G for G light. The G light incident on the collector lens 837G is parallelized and incident on the image formation area (illumination receiving area) of the liquid crystal panel 851G for G light. The reflection mirror 836 reflects the R light component having passed through the dichroic mirror 832, and the transmitted R light component is incident on the collector lens 837R for R light. The R light incident on the collector lens 837R is parallelized and incident on the image formation area (illumination receiving area) of the liquid crystal panel 851R for R light.

Since the optical path length of the blue light is longer than the optical path length of each of the other color light fluxes, a relay lens, although not shown, is disposed in each of the spaces between the dichroic mirror 831 and the reflection mirror 833 and between the reflection mirror 833 and the reflection mirror 834 to prevent the light from diverging or light usage efficiency from decreasing.

The electro-optic system 850 includes the liquid crystal panels 851 (851R, 851G, and 851B), a cross dichroic prism 852, and other components. The electro-optic system. 850 modulates the color light fluxes incident thereon in accordance with image information to form color image light.

Although not shown, a light-incident-side polarizer is disposed on the light incident side of each of the liquid crystal panels 851, and a light-exiting-side polarizer is disposed between each of the liquid crystal panels 851 and the cross dichroic prism 852. The light-incident-side polarizers, the liquid crystal panels 851, and the light-exiting-side polarizers form a light modulator that performs optical modulation on the color light fluxes incident thereon.

Each of the liquid crystal panels 851 is a transmissive panel in which a pair of transparent glass substrates encapsulate and seal a liquid crystal material, which is an electro-optic substance. For example, each of the liquid crystal panels 851 uses a polysilicon TFT as a switching device to modulate the polarization direction of one type of linearly polarized light having exited out of each of the light-incident-side polarizers in accordance with a given image signal.

The cross dichroic prism 852 combines optical images formed by the color light fluxes modulated and then outputted through the light-exiting-side polarizers with one another to form color image light. The cross dichroic prism 852 is formed by bonding four rectangular prisms and thus has a substantially square shape in a plan view. Optical multilayer films are formed along the substantially X-shaped interfaces between the bonded rectangular prisms. The optical multilayer films deflect the red light and the blue light in such a way that the red light and the blue light travel in the same direction as the green light. The three color light fluxes are thus combined with one another. The combined color image light is caused to exit toward the projection lens 861.

The projection system 860 includes the projection lens 861. The projection lens 861 is formed of a combination of a plurality of lenses and enlarges and projects the modulated and combined image light from the electro-optic system 850 to form a projection image (color image) on the screen SC or any other projection surface.

Figure 2:
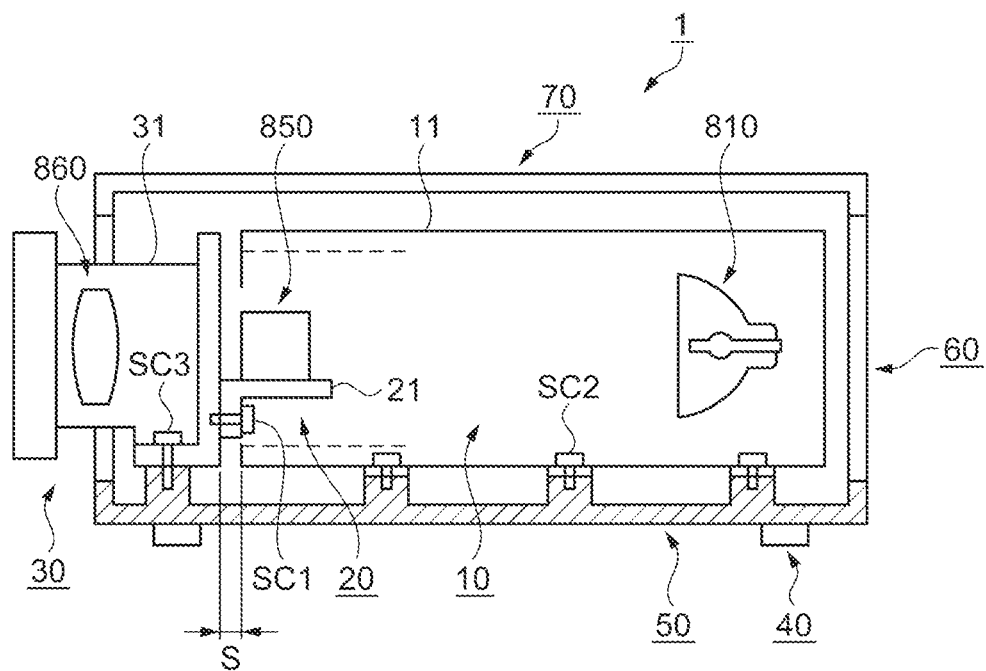
FIG. 2 is a cross-sectional view diagrammatically showing constituent members of the projector.

FIG. 2 is a cross-sectional view diagrammatically showing constituent members of the projector 1. The configuration of the projector 1 will be described with reference to FIGS. 1 and 2.

The projector 1 includes the following components as primary constituent members in the present embodiment: an illumination unit 10; an image formation unit 20; a projection unit 30; a base frame 50; legs 40; a ceiling-hung frame 60; and a ceiling-hung member 70. An exterior enclosure that forms the exterior of the projector 1 is omitted in FIG. 2.

The illumination unit 10, which is diagrammatically shown in FIGS. 1 and 2, is an optical unit that accommodates the light source apparatus 810, the illumination system 820, and the color separation system 830 in the optical system 800. The illumination unit 10 includes a first enclosure 11, which accommodates the optical elements that form the optical systems in predetermined positions.

The image formation unit 20 is an optical unit in which the electro-optic system 850 in the optical system 800 is placed. The image formation unit 20 includes a second enclosure 21, which places the optical elements that form the electro-optic system 850 in predetermined positions.

The projection unit 30 is an optical unit that accommodates the projection system 860 in the optical system 800. The projection unit 30 includes a third enclosure 31, which accommodates the optical elements (plurality of lenses) that form the projection system 860 (projection lens 861) in predetermined positions.

The image formation unit 20 is coupled to the projection unit 30. Specifically, in the present embodiment, the second enclosure 21 of the image formation unit 20 is disposed in (fixed to) the third enclosure 31 of the projection unit 30 with screws SC1. The image formation unit 20 and the projection unit 30 are thus coupled to and integrated with each other.

The base frame 50 is a member which the illumination unit 10 and the projection unit 30 which the image formation unit 20 is coupled to and integrated with are disposed on (fixed to) with screws SC2 and SC3. Specifically, the base frame 50 fixes the illumination unit 10 with the screws SC2 and fixes the projection unit 30 with the screws SC3.

Further, the legs 40, which place a body of the projector 1 on a desktop, are directly disposed on (fixed to) the base frame 50. The ceiling-hung member 70 is configured as a ceiling-hung fixing unit used when the body of the projector 1 is hung from a ceiling surface. The ceiling-hung member 70 is disposed on (fixed to) the ceiling-hung frame 60, which is disposed on the base frame 50, with screws.

Between the illumination unit 10 fixed to the base frame 50 and the projection unit 30 to which the image formation unit 20 is coupled and which is also fixed to the base frame 10, a gap S is formed, as shown in FIGS. 1 and 2. Specifically, the gap S is formed between the third enclosure of the projection unit 30 and the first enclosure 11 of the illumination unit 10, which faces the third enclosure 31. The gap S is also formed between the second enclosure 21 of the image formation unit 20 and the first enclosure 11 of the illumination unit 10, which faces the second enclosure 21.

Figure 3:
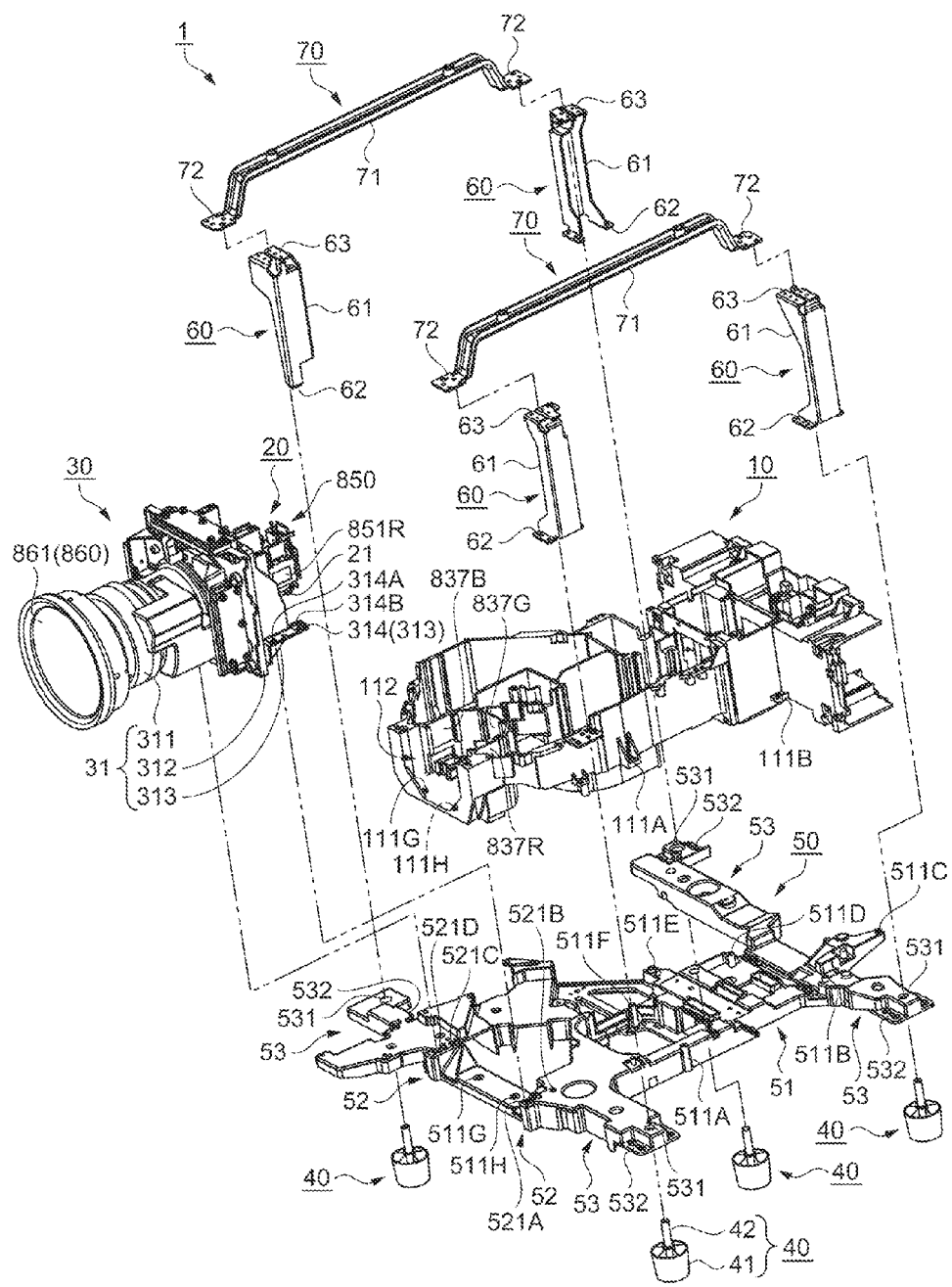
FIG. 3 is an exploded perspective view of constituent members.
Figure 4:
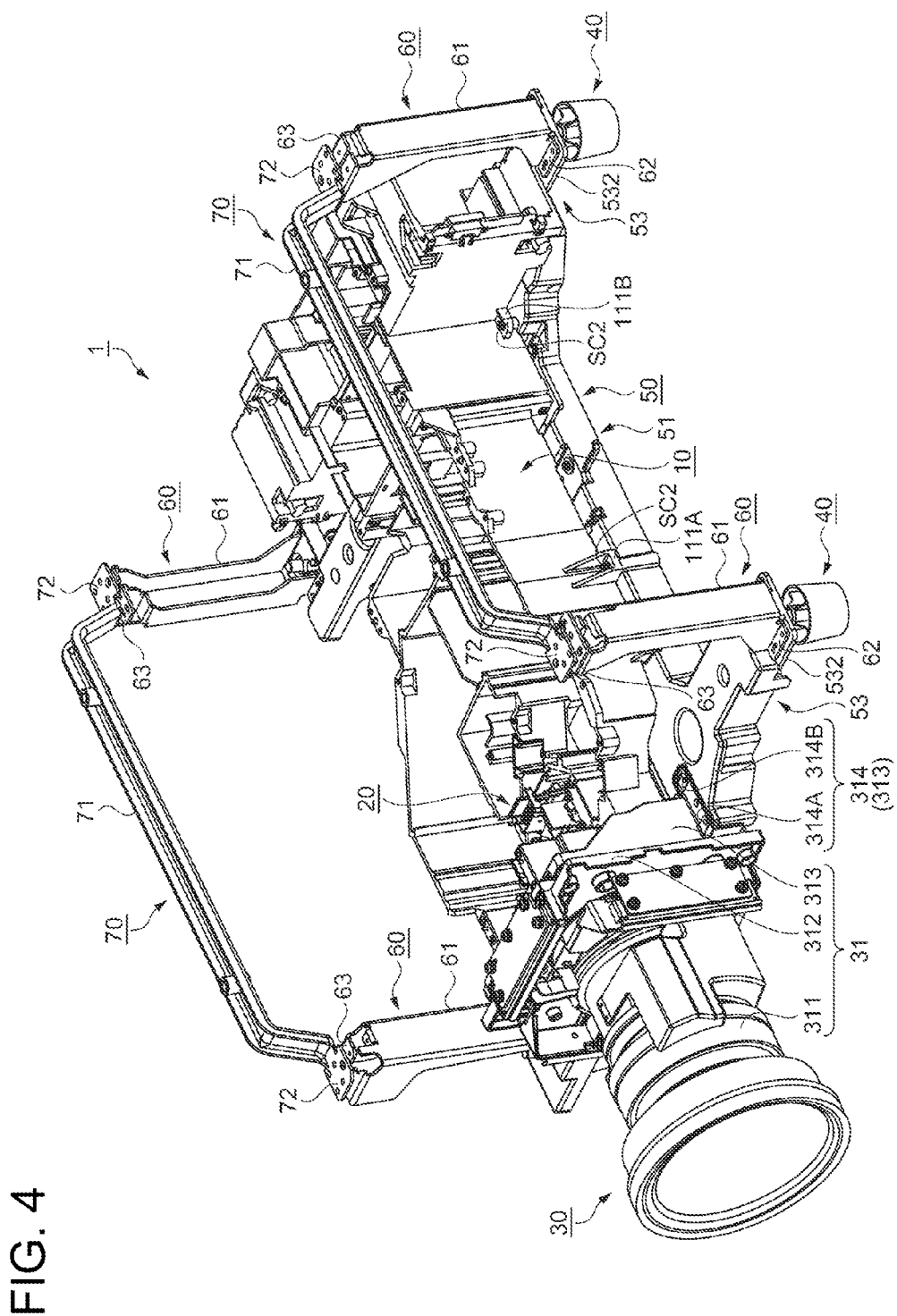
FIG. 4 is a perspective view showing a state in which the constituent members are assembled.
Figure 5:
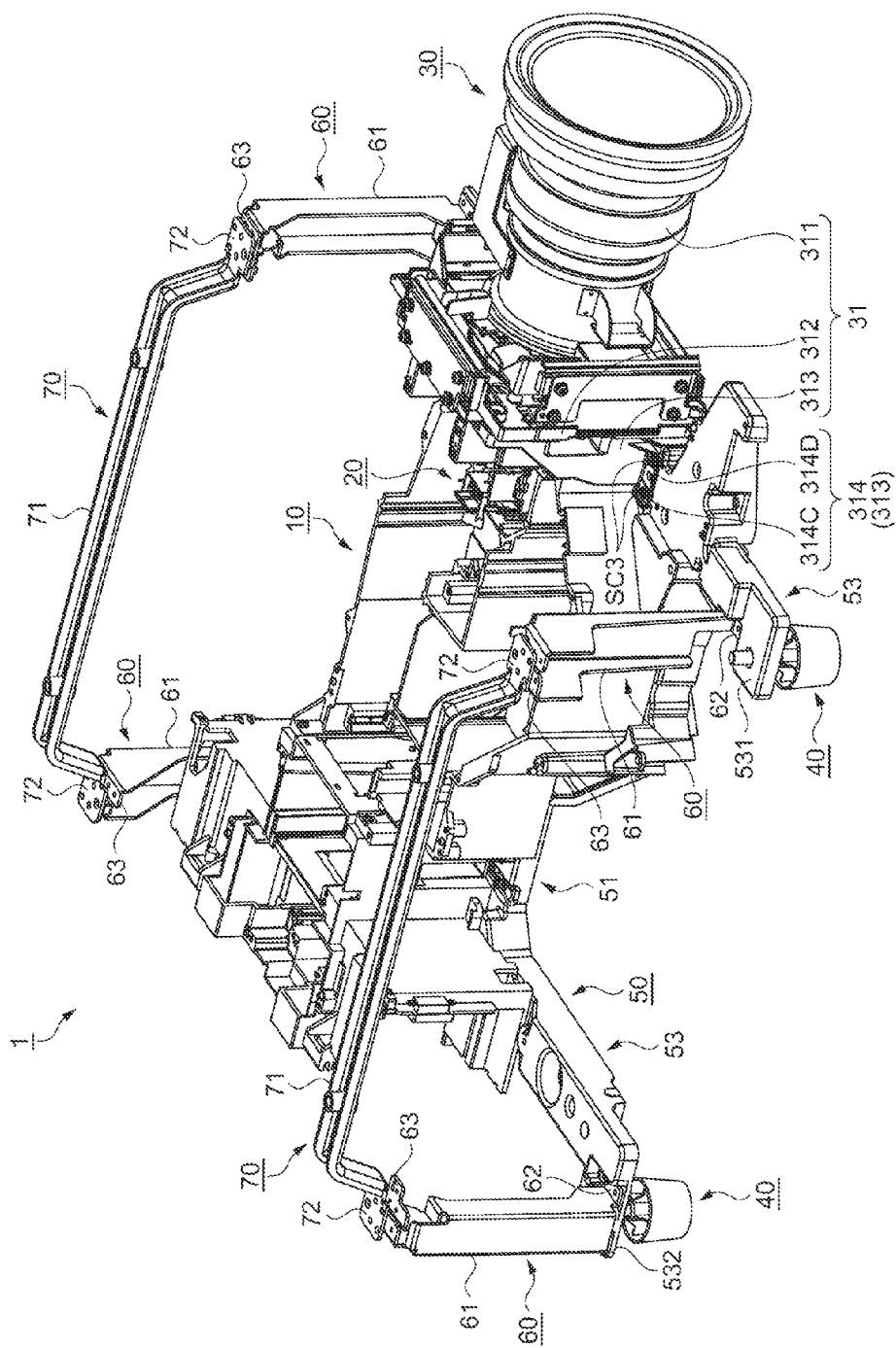
FIG. 5 is another perspective view showing a state in which the constituent members are assembled.
Figure 6:
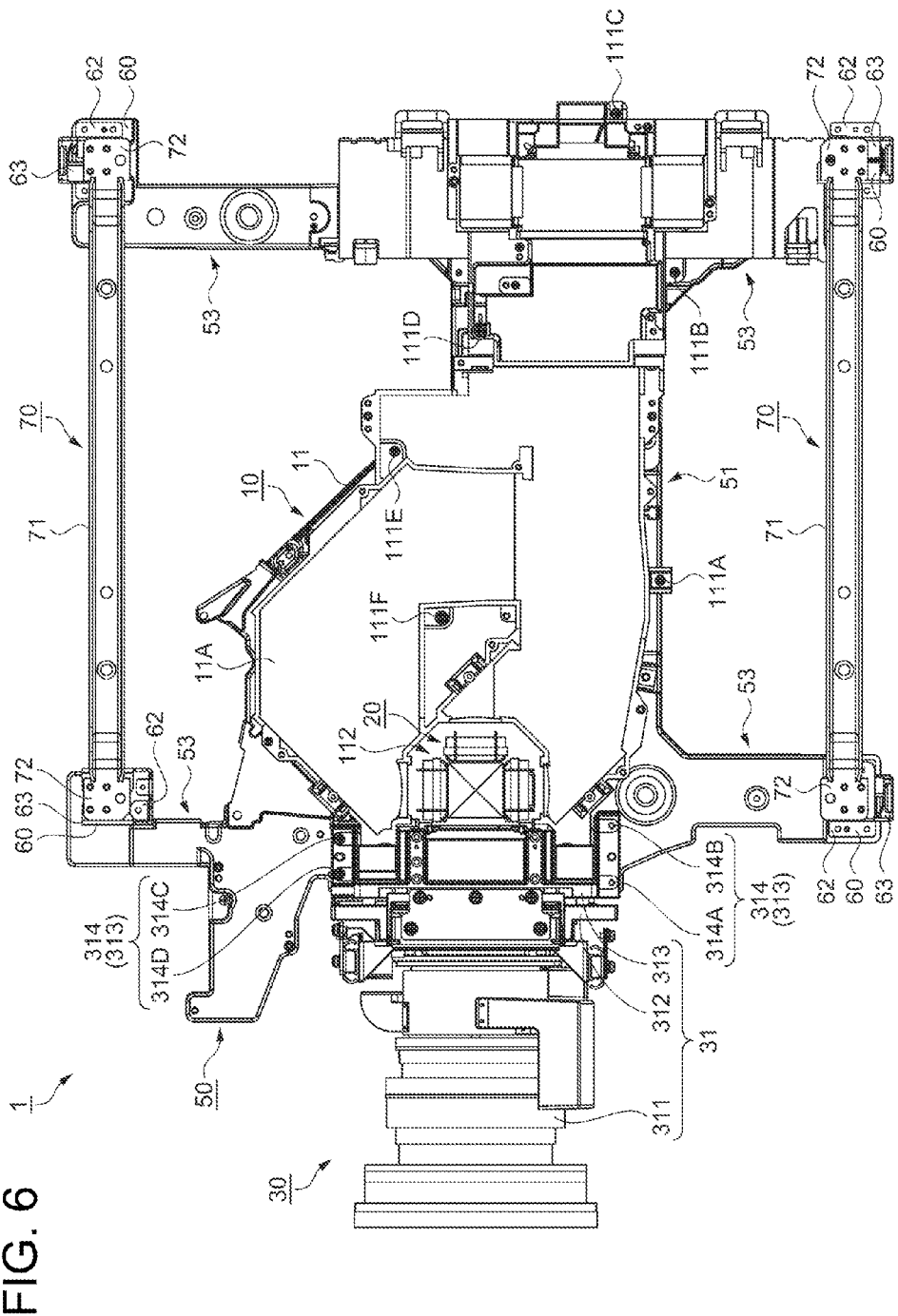
FIG. 6 is a plan view of the constituent members viewed from above.
Figure 7A:
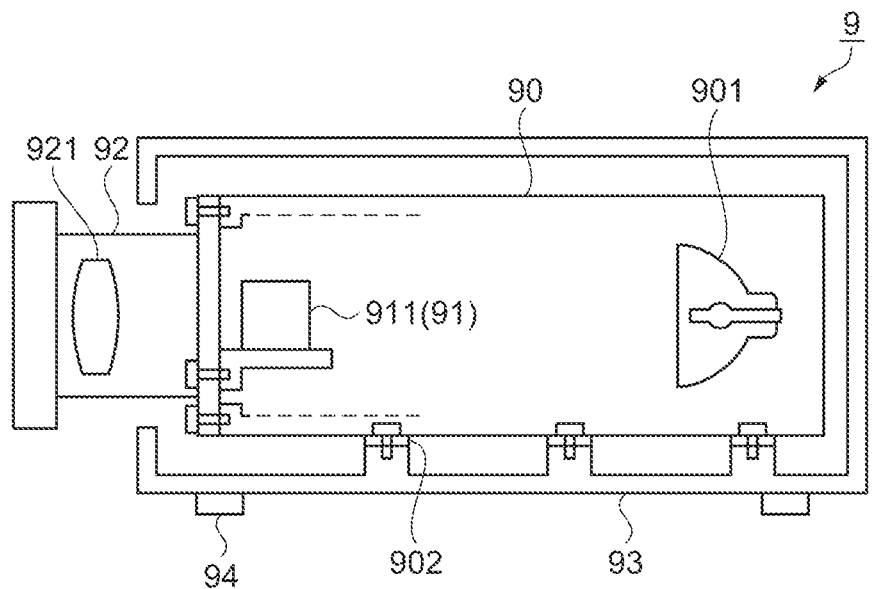
FIGS. 7A and 7B are cross-sectional views diagrammatically showing a schematic configuration of a projector of related art.
Figure 7B:
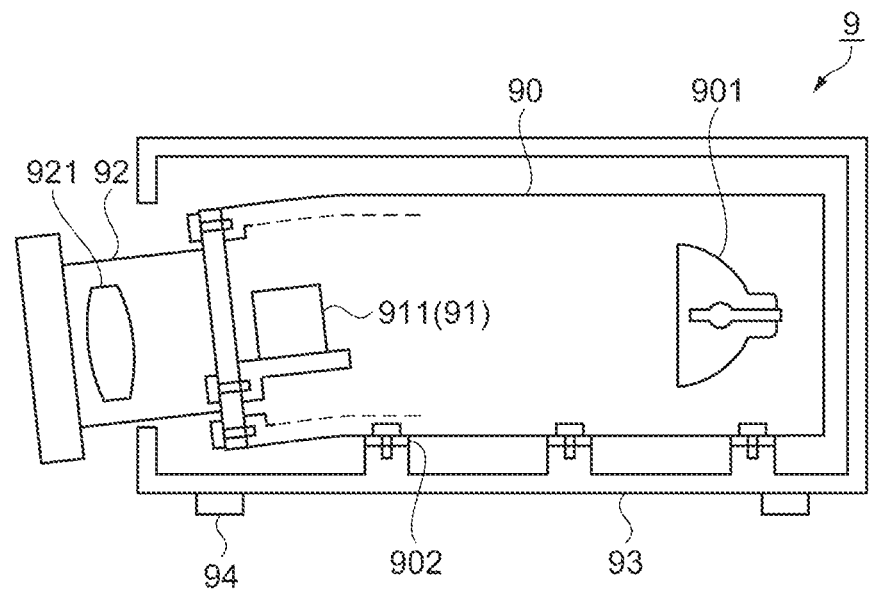

FIG. 3 is an exploded perspective view of constituent members, which are viewed from an upper right position when seen from the front of the projection unit 30. FIGS. 4 and 5 are perspective views each showing a state in which the constituent members are assembled. Specifically, FIG. 4 is a perspective view of the assembled constituent members viewed from an upper right position when seen from the front of the projection unit 30, and FIG. 5 is a perspective view of the assembled constituent members viewed from an upper left position when seen from the front of the projection unit 30. FIG. 6 is a plan view of the constituent members viewed from above. In FIGS. 3 to 6, the exterior enclosure and the optical elements accommodated in the first enclosure 11 of the illumination unit 10 are omitted. In FIG. 6, the legs 40 are also omitted.

The configurations of the constituent members and a method for assembling the constituent members will be described with reference to FIGS. 3 to 6.

As described above, the illumination unit 10 includes the first enclosure 11, which has a box-like shape and accommodates the optical elements that form the light source apparatus 810, the illumination system 820, and the color separation system 830. The first enclosure 11 includes a cover member 11A (see FIG. 6). After the optical elements of the illumination unit 10 are accommodated in predetermined positions in the first enclosure 11, the cover member 11A is fixed thereto with screws to cover the optical elements. Further, a plurality of fixing portions 111 to be fixed to the base frame 50 are formed on the exterior and interior of the first enclosure 11.

The fixing portions 111 are formed of the following eight fixing portions 111 in total in the present embodiment: fixing portions 111A to 111F, each of which has a hole, as shown in FIG. 6; and fixing portions 111G and 111H, each of which has a hole and is positioned below the image formation unit 20 as shown in FIG. 3. The fixing portions 111 are fixed to the base frame 50 with the screws SC2 (see FIG. 4).

The first enclosure 11 has a space area 112 (see FIG. 3), which covers three sides of the image formation unit 20 (electro-optic system 850). The collector lenses 837 (see FIGS. 1 and 3), which form the color separation system 830, are disposed on side surfaces of the first enclosure 11 that correspond to the three sides and form the space area 112. The first enclosure 11 is formed of a synthetic resin member made, for example, of unsaturated polyester.

The image formation unit 20 includes the second enclosure 21 (see FIGS. 2 and 3), which places and fixes the optical elements that form the electro-optic system 850, as described above. Specifically, the cross dichroic prism 852 is fixed to the second enclosure 21, and the light-incident-side polarizer, the liquid crystal panel 851, and the light-exiting-side polarizer for each of the color light fluxes with optical positions thereof adjusted are bonded to the corresponding one of the side surfaces of the cross dichroic prism 852 that correspond to the three sides.

The second enclosure 21 has fixing portions (not shown) each of which has a hole and is fixed to the third enclosure 31 of the projection unit 30, which will be described later. The fixing portions are fixed to the third enclosure 31 with the screws SC1 (see FIG. 2). The second enclosure 21 is formed in die casting using a magnesium alloy or any other metal, which allows an increase in the modulus of elasticity and a decrease in dependency of the modulus of elasticity on temperature, whereby the second enclosure 21 has improved rigidity and is unlikely to deform due to a change in temperature.

The projection unit 30 includes the third enclosure 31, which accommodates the projection system 860, as described above. The third enclosure 31 is formed of a cylindrical lens enclosure 311, which accommodates the projection lens 861, a substantially rectangular movable enclosure 312, which holds the lens enclosure 311 and shifts the lens enclosure 311 for projection position adjustment, and a substantially rectangular fixable enclosure 313, which movably holds the movable enclosure 312 and is fixed to the base frame 50.

The fixable enclosure 313 has a plurality of fixing portions 314 to be fixed to the base frame 50, as shown in FIGS. 3 to 6. In the present embodiment, the fixing portions 314 are formed of fixing portions 314A to 314D, each of which has a hole. The fixing portions 314 are fixed to the base frame 50 with the screws SC3.

The lens enclosure 311 of the third enclosure 31 is formed in injection molding using a synthetic resin member. The movable enclosure 312 and the fixable enclosure 313 of the third enclosure 31 are formed in die casting using a magnesium alloy or any other metal.

Further, the fixable enclosure 313 has fixation accepting portions (not shown) formed in a surface portion facing the image formation unit 20 (second enclosure 21) described above, and the fixation accepting portions fix the fixing portions of the second enclosure 21. Specifically, each of the fixation accepting portions has a threaded hole (not shown). The image formation unit 20 is coupled to the projection unit 30 when the fixing portions of the second enclosure 21 of the image formation unit 20 are fixed to the fixation accepting portions of the fixable enclosure 313 with the screws SC1 (see FIG. 2).

The base frame 50 is a base member which various constituent members are disposed on (fixed to). The base frame 50 fixes the illumination unit 10, the projection unit 30, the legs 40, and the ceiling-hung frame 60, which fixes the ceiling-hung member 70. The base frame 50 further fixes the exterior enclosure, which is not shown. The exterior enclosure is made, for example, of a synthetic resin or a metal material.

The base frame 50 is configured in the form of a substantially plate-like shape having a minimum necessary flat surface for fixing the constituent members described above. Specifically, the base frame 50 is generally formed of an illumination unit area 51, which is an area where the first enclosure 11 of the illumination unit 10 is fixed, a projection unit area 52, which is an area where the third enclosure 31 (fixable enclosure 313) of the projection unit 30 is fixed, and leg areas 53, which are areas where the legs 40 are fixed and which extend in two directions (rightward and leftward) from the front-side and rear-side centers of the projector 1, which has a rectangular shape in a plan view, to corner portions of the projector 1. The leg areas 53 are also areas where the ceiling-hung frame 60, which fixes the ceiling-hung member 70, is fixed.

The base frame 50 is formed in die casting using a magnesium alloy or any other metal, which allows an increase in the modulus of elasticity and a decrease in dependency of the modulus of elasticity on temperature, whereby the base frame 50 has improved rigidity and is unlikely to deform due to a change in temperature.

The illumination unit area 51 of the base frame 50 has fixation accepting portions 511A to 511H, each of which is formed of a threaded hole, in correspondence with the fixing portions 111A to 111H of the first enclosure 11, as shown in FIG. 3.

A description of how to assemble (how to fix) the constituent members to the base frame 50 will be made below as appropriate in conjunction with a description of the configuration of each of the constituent members.

As a preliminary step of fixing the constituent members other than the base frame 50, a lower enclosure (not shown) that forms the exterior enclosure is fixed to the lower surface of the base frame 50 with screws.

The illumination unit 10 is assembled to the base frame 50 as follows: The first enclosure 11 of the illumination unit 10 is placed on the illumination unit area 51 of the base frame 50 fixed to the lower enclosure, and the screws SC2 are then inserted into the fixing portions 111A to 111H of the first enclosure 11 and threaded into the threaded holes of the fixation accepting portions 511A to 511H.

The projection unit area 52 of the base frame 50 has fixation accepting portions 521A to 521D, each of which is formed of a threaded hole, in correspondence with the fixing portions 314A to 314D of the third enclosure 31 (fixable enclosure 313), as shown in FIG. 3.

The projection unit 30 (to which the image formation unit 20 is coupled) is assembled to the base frame 50 after the illumination unit 10 is fixed to the base frame 50. First, the image formation unit 20 is inserted from above into the space area 112 in the illumination unit 10 fixed to the base frame 50, and the fixing portions 314 of the third enclosure 31 (fixable enclosure 313) are placed on the projection unit area 52 of the base frame 50 at the same time. The screws SC3 are then inserted into the fixing portions 314A to 314D of the fixable enclosure 313 and threaded into the threaded holes in the fixation accepting portions 512A to 521D. The projection unit 30 is thus assembled to the base frame 50.

The illumination unit 10 and the projection unit 30 are disposed on the base frame 50 with the gap S shown in FIGS. 1 and 2 provided therebetween. The gap S shown in FIGS. 1 and 2 is conceptually drawn, and it should be appreciated that no linear gap S is provided uniformly in the projection direction. In practice, the gap S is provided at a plurality of locations where the illumination unit 10 (first enclosure 11) and the projection unit 30 (third enclosure 31) are close to each other and shaped in accordance with the shapes of constituent members at the plurality of locations, and the gap S is not only present in the projection direction but also present in other directions in accordance with the shapes of the constituent members. The gap S is also present between the image formation unit 20 (second enclosure 21) disposed on the projection unit 30 and the illumination unit 10 (first enclosure 11).

The size of the gap S is so adjusted along the portion where the gap S is provided that the illumination unit 10 (first enclosure 11) and the projection unit 30 (third enclosure 31) do not come into contact with each other, in other words, they do not abut and press each other even when they deform in consideration of the amount of deformation of each of the constituent members that occurs when it expands and the modulus of elasticity thereof changes within a temperature range over which the projector 1 is used. A sufficient amount of gap between the image formation unit 20 (second enclosure 21) disposed on the projection unit 30 and the illumination unit 10 (first enclosure 11) is also provided.

Each of the legs 40 is a member that allows the body of the projector 1 to be placed on a desktop or any other surface, and the legs 40 are fixed to the base frame 50. The number of legs 40 in the present embodiment is four in correspondence with the four corners of the projector 1 having a rectangular shape in a plan view. Each of the legs 40 is formed of a leg body 41 placed on a desktop or any other surface and a threaded portion 42 for fixation purposes, as shown in FIG. 3.

A fixation accepting portion 531, which has a threaded hole used to fix the corresponding leg 40, is formed at an end portion of each of the leg areas 53 of the base frame 50, as shown in FIG. 3. Further, holes are formed in the lower enclosure fixed to the base frame 50 in correspondence with the threaded holes provided in the fixation accepting portions 531 and used to fix the legs 40.

The legs 40 are assembled to the base frame 50 as follows: The threaded portions 42 of the legs 40 are inserted into the holes provided in the lower enclosure through the lower surface side of the lower enclosure, and the threaded portions 42 of the legs 40 are threaded into the threaded holes in the fixation accepting portions 531 of the base frame 50. It is noted that when the legs 40 are fixed to the base frame 50, the legs 40 (leg bodies 41) do not press the surface of the lower enclosure.

The ceiling-hung frame 60 is a member configured as an interposed member used when the ceiling-hung member 70 is fixed to the base frame 50. The ceiling-hung frame 60 is fixed to the end portions (on the side facing away from the side where the legs 40 are fixed) of the four leg areas 53 of the base frame 50 in such a way that the ceiling-hung frame 60 stands on the base frame 50. The ceiling-hung frame 60 is formed of four members in correspondence with the end portions of the four leg areas 53.

The four ceiling-hung frames 60, the detailed shapes of which differ from each other, are each formed by bending a metal member into a substantially columnar shape, and an increase in the modulus of elasticity and a decrease in dependency of the modulus of elasticity on temperature can be achieved, whereby the ceiling-hung frames 60 have improved rigidity and are unlikely to deform due to a change in temperature. In the present embodiment, the metal member is a steel plate (cold rolled steel plate).

Each of the ceiling-hung frames 60 is specifically formed of a ceiling-hung frame body 61, a base-side fixing portion 62, which is formed at one end of the ceiling-hung frame body 61 and has holes used to fix the base-side fixing portion 62 to the base frame 50, and a ceiling-hung-side fixing portion 63, which is formed at the other end of the ceiling-hung frame body 61 and has threaded holes used to fix the ceiling-hung-side fixing portion 63 to the ceiling-hung 70.

Fixation accepting portions 532, each of which has threaded holes used to fix the corresponding ceiling-hung frame 60, are formed at the end portions of the leg areas 53 of the base frame 50, as shown in FIG. 3. The ceiling-hung frames 60 are assembled to the base frame 50 as follows: The base-side fixing portions 62 of the ceiling-hung frames 60 are placed on the upper surfaces of the leg areas 53 of the base frame 50, and then screws (not shown) are inserted into the holes in the base-side fixing portions 62 and threaded into the threaded holes in the fixation accepting portions 532.

The ceiling-hung member 70 is a member used when the body of the projector 1 is fixed to a ceiling. The ceiling-hung member 70 is formed of two members, which are formed by bending metal members into substantially the same shape, and an increase in the modulus of elasticity and a decrease in dependency of the modulus of elasticity on temperature can be achieved, whereby the ceiling-hung members 70 have improved rigidity and are unlikely to deform due to a change in temperature. In the present embodiment, each of the metal members is a steel plate (cold rolled steel plate).

Each of the ceiling-hung members 70 is formed of a ceiling-hung member body 71 and ceiling-hung member fixing portions 72 formed at opposite ends of the ceiling-hung member body 71. The ceiling-hung member fixing portions 72, which are formed at opposite ends of the ceiling-hung member body 71, have substantially the same shape. Each of the ceiling-hung member fixing portions 72 has holes used to fix the ceiling-hung member fixing portion 72 to the corresponding ceiling-hung frame 60.

The ceiling-hung members 70 are fixed in parallel to the projection direction to the ceiling-hung frames 60 fixed to the base frame 50. Each of the ceiling-hung members 70 is therefore fixed to the ceiling-hung-side fixing portions 63 of two ceiling-hung frames 60 disposed in parallel to the projection direction. Specifically, the ceiling-hung member fixing portions 72 at opposite ends of each of the ceiling-hung members 70 are fixed to the ceiling-hung-side fixing portions 63 of two ceiling-hung frames 60.

In the present embodiment, when the ceiling-hung members 70 are fixed to the ceiling-hung frames 60, an upper enclosure (not shown) that forms the exterior enclosure, which is not shown, is interposed between the ceiling-hung members 70 and the ceiling-hung frames 60. Specifically, the upper enclosure is interposed between the ceiling-hung member fixing portions 72 of the ceiling-hung members 70 and the ceiling-hung-side fixing portions 63 of the ceiling-hung frames 60. Holes are formed in interposed areas of the upper enclosure in correspondence with the holes provided in the ceiling-hung member fixing portions 72.

The ceiling-hung members 70 are assembled to the ceiling-hung frames 60 after the ceiling-hung frames 60 are fixed to the base frame 50. The assembly is performed as what is called a final step after the controller (not shown), the power supply (not shown), the cooler (not shown), and other constituent members are disposed in the lower enclosure fixed to the base frame 50.

After the ceiling-hung frames 60 are fixed to the base frame 50, the upper enclosure is placed on the ceiling-hung-side fixing portions 63 of the four ceiling-hung frames 60. The ceiling-hung members 70 are then so placed on the upper enclosure that the ceiling-hung member fixing portions 72 of the ceiling-hung members 70 face the holes provided in the upper enclosure. Screws (not shown) are then inserted into the holes provided in the ceiling-hung member fixing portions 72 and further into the holes provided in the upper enclosure and threaded into the threaded holes in the ceiling-hung-side fixing portions 63 of the ceiling-hung frames 60. The assembly is thus performed.

The upper enclosure is thus fastened by both the ceiling-hung frames 60 and the ceiling-hung members 70. In other words, the ceiling-hung members 70 are indirectly fixed to the base frame 50 via the ceiling-hung frames 60 and the upper enclosure, which serve as the interposed member.

Further, since the ceiling-hung members 70 are members exposed through the exterior enclosure (upper enclosure) (exteriorly visible members), a ceiling-hung cover (not shown) made of a synthetic resin that covers the ceiling-hung members 70 is fixed to the ceiling-hung member bodies 71 with screws (not shown) after the ceiling-hung members 70 are fixed.

The projector 1 is thus assembled.

A method for installing the projector 1 on a ceiling (ceiling-hung installation) will be described.

In the present embodiment, the projector 1 is so installed in the form of the ceiling-hung installation by using the ceiling-hung members 70 disposed on the projector 1. Specifically, fixing brackets (not shown) that form a ceiling-hanging apparatus (not shown) fixed to the ceiling with anchor bolts (not shown) are used to hold and fix the two ceiling-hung members 70 in such a way that the fixing brackets grab the respective two ceiling-hung members 70. The projector 1 is thus installed on the ceiling (ceiling-hung installation).

According to the projector 1 of the present embodiment, the following advantageous effects are provided.

In the projector 1 of the present embodiment, the illumination unit 10 and the projection unit 30 to which the image formation unit 20 is coupled are disposed on the base frame 50 in such a way that the illumination unit 10 and the projection unit 30 are structurally separate from each other, and the gap S is provided between the thus disposed illumination unit 10 and projection unit 30. Therefore, even when the illumination unit 10 and the projection unit 30 deform due to a change in temperature, the gap S can accommodate the amount of deformation. In other words, providing the gap S can accommodate deformation that occurs in a situation in which the illumination unit 10 and the projection unit 30 expand, abut, and press each other. The projection unit 30 will therefore not be inclined downward due to deformation resulting from an increase in temperature, unlike a projector of related art. The projector 1 achieved in the present embodiment can suppress shift in the projection position because the projector 1 can accommodate deformation of the illumination unit 10 and the projection unit 30 to which the image formation unit 20 is coupled due to a change in temperature.

In the projector 1 of the present embodiment, the legs 40 are directly disposed on the base frame 50. Therefore, when the projector 1 is placed on a desktop or any other surface, deformation of the base frame 50 relative to the legs 40 can be suppressed even when temperature increases. Therefore, an effect of the deformation on the illumination unit 10 disposed on the base frame 50 and the projection unit 30 to which the image formation unit 20 is coupled can be reduced, whereby the projector 1 achieved in the present embodiment suppresses shift in the projection position.

In the projector 1 of the present embodiment, the ceiling-hung members 70 as the ceiling-hung fixing unit are indirectly disposed on the base frame 50 via an interposed member (ceiling-hung frames 60 and upper enclosure). Further, in the present embodiment, the ceiling-hung members 70 are fixed to the ceiling-hung frames 60 with screws although the upper enclosure is interposed between them. As a result, when the projector 1 is so installed that it is hung from a ceiling surface, deformation of the base frame 50 relative to the ceiling-hung members 70 due to an increase in temperature can be suppressed. Therefore, an effect of the deformation on the illumination unit 10 disposed on the base frame 50 and the projection unit 30 to which the image formation unit 20 is coupled can be reduced, whereby the projector 1 achieved in the present embodiment suppresses shift in the projection position.

In the projector 1 of the present embodiment, since the base frame 50 is formed of a metal member (made of magnesium alloy), the modulus of elasticity of the base frame 50 can be increased and dependency of the modulus of elasticity on temperature can be decreased, whereby the base frame 50 is unlikely to deform due to a change in temperature. Shift in the projection position can therefore be suppressed.

In the projector 1 of the present embodiment, since each of the ceiling-hung members 70 (ceiling-hung fixing unit) and the ceiling-hung frames 60 (interposed member) is formed of a metal member (steel plate: cold rolled steel plate), an increase in the modulus of elasticity of the ceiling-hung members 70 and the ceiling-hung frames 60 and a decrease in dependency of the modulus of elasticity on temperature can be achieved, whereby the ceiling-hung members 70 and the ceiling-hung frames 60 are unlikely to deform due to a change in temperature. Shift in the projection position can therefore be suppressed.

The invention is not limited to the embodiment described above, and a variety of changes, improvements, and other modifications can be made thereto to the extent that they do not depart from the substance of the invention. Variations follow.

In the projector 1 of the embodiment described above, the legs 40 are directly disposed on the base frame 50. The legs 40 may instead be indirectly disposed with interposed members between the legs 40 and the base frame 50. In this case, the advantageous effect of the suppression of deformation due to a change in temperature is improved when the interposed members are formed of metal members.

In the projector 1 of the embodiment described above, the ceiling-hung members 70 as the ceiling-hung fixing unit are indirectly fixed to the base frame 50 via the ceiling-hung frames 60 as the interposed member. A structure in which the ceiling-hung members 70 are directly disposed on the base frame 50 may instead be employed by changing the ceiling-hung members 70 or changing the base frame 50.

In the projector 1 of the embodiment described above, the second enclosure 21, in which the electro-optic system 850 in the image formation unit 20 is placed, is disposed on the third enclosure 31 (fixable enclosure 313) of the projection unit 30. The electro-optic system 850 in the image formation unit 20 may instead be placed in the fixable enclosure 313 of the projection unit 30 by changing the fixable enclosure 313 to have the function of the second enclosure 21.

In the projector 1 of the embodiment described above, the ceiling-hanging apparatus disposed on a ceiling grabs and holds each of the ceiling-hung members 70. The ceiling-hung members 70 are not necessarily held or fixed this way and may instead, for example, be hooked to or otherwise fixed to the ceiling-hanging apparatus to be held and fixed.

In the projector 1 of the embodiment described above, the ceiling-hung members 70 as the ceiling-hung fixing unit are exposed through the exterior enclosure (upper enclosure). The ceiling-hung members 70 are not necessarily exposed, and the ceiling-hung members may instead be disposed in the upper enclosure. To this end, threaded holes for fixing purposes may be provided in the ceiling-hung members, and holes may be provided in the upper enclosure in correspondence with the threaded holes. In this case, the threaded holes serve as the ceiling-hung fixing unit. In this configuration, when the projector 1 is installed on a ceiling, bolts accompanying the ceiling-hanging apparatus installed on the ceiling can be screwed into the threaded holes to install the projector 1 in the form of the ceiling-hung installation.

In the projector 1 of the embodiment described above, the ceiling-hung members 70 as the ceiling-hung fixing unit are raised by the ceiling-hung frames 60 and exposed through the exterior enclosure (upper enclosure). The ceiling-hung members 70 are not necessarily exposed and may instead be disposed in the lower enclosure on the same side as the legs 40. In this case, the base frame 50 may have the function of the ceiling-hung members 70. Specifically, threaded holes for fixing purposes may be provided in the base frame 50, and holes may be provided in the lower enclosure in correspondence with the threaded holes. In this case, the threaded holes serve as the ceiling-hung fixing unit. In this configuration, when the projector 1 is installed on a ceiling, the projector 1 is installed upside down, and bolts accompanying the ceiling-hanging apparatus installed on the ceiling are screwed into the threaded holes, whereby the projector 1 can be installed in the form of the ceiling-hung installation. In this case, since the ceiling-hung fixing unit is directly installed in the base frame, no interposed member is required, whereby manufacturing cost can be reduced.

In the projector 1 of the embodiment described above, the exterior enclosure and the base frame 50 are separate members. The base frame 50 may instead be configured to have the function of the exterior enclosure.

In the projector 1 of the embodiment described above, each of the base frame 50, the second enclosure 21, and the third enclosure 31 (movable enclosure 312, fixable enclosure 313) is formed of a metal member made of a magnesium alloy, and each of the ceiling-hung members 70 and the ceiling-hung frames 60 is formed of a metal member in the form of a steel plate (cold rolled steel plate). The members described above can be replaced with a variety of other members. In this case, a member having a modulus of elasticity comparable to the modulus of elasticity in the embodiment described above and showing a small amount of change in the modulus of elasticity with temperature may be used.

In the projector 1 of the embodiment described above, the three liquid crystal panels 851 are employed as the light modulator. The number of liquid crystal panels is not limited to three, and one liquid crystal panel configured to display a color image may be employed as the light modulator.

In the projector 1 of the embodiment described above, each of the three liquid crystal panels 851 as the light modulator is a transmissive liquid crystal panel (light modulator). The light modulator is not limited to a transmissive light modulator and may instead be a reflective light modulator, a micromirror-type light modulator, or any other type of light modulator. An example of the micromirror-type light modulator can, for example, be a DMD (digital micromirror device) (trademark of Texas Instruments).

The entire disclosure of Japanese Patent Application No. 2014-054508, filed Mar. 18, 2014 is expressly incorporated by reference herein.

What is claimed is:

1. A projector in which light outputted from a light source apparatus is modulated by a light modulator in accordance with image information and the modulated light is projected through a projection lens onto a projection surface, the projector comprising:
    an illumination unit having an optical system including the light source apparatus;
    an image formation unit having an optical system including the light modulator;
    a projection unit having an optical system including the projection lens; and
    a base frame on which the illumination unit and the projection unit are disposed,
    wherein
    a gap is provided between the illumination unit and the projection unit,
    the image formation unit is coupled to the projection unit at a position disposed in the gap between the illumination unit and the projection unit,
    the illumination unit includes a first enclosure surrounding the optical system that includes the light source apparatus,
    the image formation unit includes a second enclosure that places the light modulator in a predetermined position,
    the image formation unit is coupled to the projection unit by coupling the second enclosure to the projection unit, and
    at least a first portion of the second enclosure is disposed at a position surrounded by the first enclosure and at least a second portion of the second enclosure is disposed at a position in the gap between the illumination unit and the projection unit.

2. The projector according to claim 1,
further comprising legs used when the projector is placed,
wherein the legs are disposed on the base frame directly or indirectly via interposed members each of which is a metal member.

3. The projector according to claim 1,
further comprising a ceiling-hung fixing unit used when the projector is hung,
wherein the ceiling-hung fixing unit is disposed on the base frame directly or indirectly via an interposed member that is a metal member.

4. The projector according to claim 3,
wherein the ceiling-hung fixing unit is formed of a metal member.

5. The projector according to claim 1,
wherein the base frame is formed of a metal member.

* * * * *